United States Patent [19]
Takahashi et al.

[11] Patent Number: 5,873,639
[45] Date of Patent: Feb. 23, 1999

[54] ANTI-LOCK BRAKE CONTROL SYSTEM FOR VEHICLE

[75] Inventors: Susumu Takahashi; Yutaka Horiuchi; Yutaka Maruyama; Yoshikazu Nojiri; Ryo Suzuki; Toshio Yahagi, all of Wako, Japan

[73] Assignee: Honda Giken Kogyo Kabushiki Kaisha, Tokyo, Japan

[21] Appl. No.: 715,733

[22] Filed: Sep. 19, 1996

[30] Foreign Application Priority Data

Sep. 27, 1995 [JP] Japan .................................. 7-249692

[51] Int. Cl.⁶ ...................................................... B60T 8/58
[52] U.S. Cl. ........................................... 303/194; 303/196
[58] Field of Search ..................................... 303/157, 158, 303/195, 196, 194; 701/75, 74

[56] References Cited

U.S. PATENT DOCUMENTS

| | | | |
|---|---|---|---|
| 3,727,992 | 4/1973 | Bowler et al. | 303/195 |
| 3,863,993 | 2/1975 | Fleischer et al. | 303/195 |
| 4,320,460 | 3/1982 | Brearley et al. | 303/158 X |
| 5,012,417 | 4/1991 | Watanabe et al. | 364/426 |
| 5,125,723 | 6/1992 | Sakuma et al. | 303/100 |
| 5,425,574 | 6/1995 | Sano | 303/97 |

FOREIGN PATENT DOCUMENTS

| | | |
|---|---|---|
| 0 583 988 | 3/1994 | European Pat. Off. |
| 39 06 680 | 9/1989 | Germany. |
| 40 35 676 | 12/1994 | Germany. |

*Primary Examiner*—Lee W. Young
*Attorney, Agent, or Firm*—Nikaido Marmelstein Murray & Oram, LLP

[57] ABSTRACT

In an anti-lock brake control system, an actuator is controlled based on at least a slip rate determined in a slip rate calculating device and an output from a low-pass filter for filtering a wheel acceleration determined in a wheel acceleration calculating device, thereby switching-over the braking-pressure reducing, maintaining and increasing modes from one to another. The braking pressure-reduction control provided by an operation control device is terminated in response to the wheel acceleration determined in the wheel acceleration calculating device becoming equal to or larger than a preset value. Thus, it is possible to prevent an excessive pressure reduction during an anti-lock brake control on a road surface having a high coefficient of friction.

1 Claim, 5 Drawing Sheets

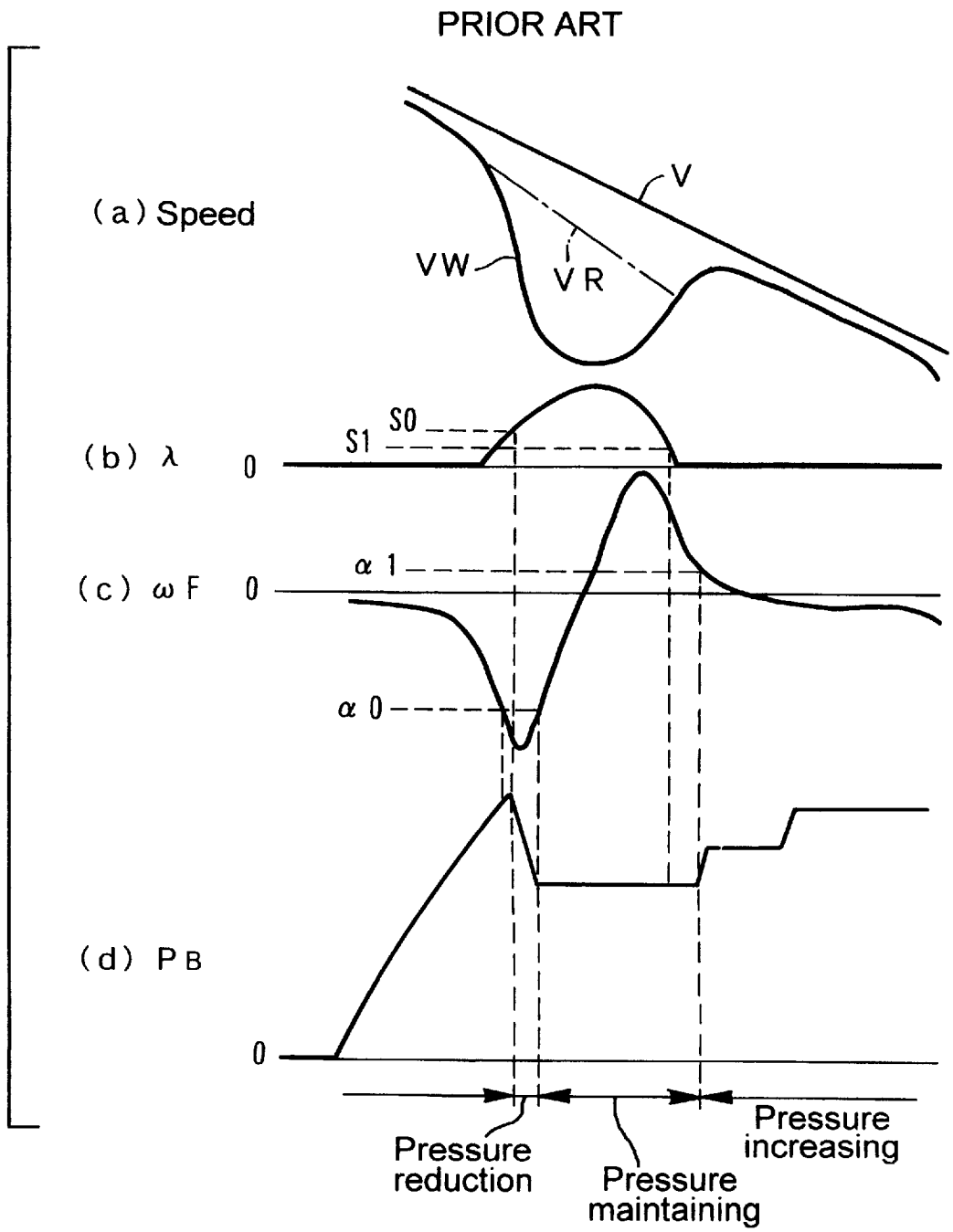

ANTI-LOCK BRAKE CONTROL SYSTEM FOR VEHICLE

BACKGROUND OF THE INVENTION

1. Field of the Invention

The present invention relates to an anti-lock brake control system for a vehicle, comprising: an actuator for regulating the braking pressure for a wheel brake; a wheel speed detecting means for detecting a wheel speed; a wheel acceleration calculating means for differentiating the wheel speed detected by the wheel speed detecting means to provide a wheel acceleration; a vehicle speed calculating means for calculating a presumed vehicle speed based on the wheel speed detected by the wheel speed detecting means; a slip rate calculating means for calculating a slip rate based on the wheel speed detected by the wheel speed detecting means and the presumed vehicle speed determined in the vehicle speed calculating means; a low-pass filter for filtering the wheel acceleration determined in the wheel acceleration calculating means; and an operation control means for controlling the actuator based on at least the slip rate determined in the slip rate calculating means and an output from the low-pass filter during a braking operation to switch-over the reduction, the maintaining and the increasing of the braking pressure from one to another.

2. Description of the Related Art

A system is conventionally constructed as shown in FIG. 4. The actuator 1 for regulating the braking pressure for the wheel brake is driven by an actuator driving means 2, and a control signal from the operation control means 3 is input to the actuator driving means 2. A presumed vehicle speed VR is calculated by the vehicle speed calculating means 5 based on the wheel speed VW detected by the wheel speed detecting means 4, and a slip rate λ is calculated in the slip rate calculating means 6 based on the wheel speed VW and the presumed vehicle speed VR. The wheel speed VW is differentiated in the wheel acceleration calculating means 7, and the wheel acceleration ω is filtered in the low-pass filter 8. An output ωF from the low-pass filter 8 and the slip rate λ are input to the operation control means 3. A signal indicative of a command to control the operation of the actuation 1 based on the output ωF from the low-pass filter 8 and the slip rate λ is output from the operation control means 3.

In such an anti-lock brake control system, the actual vehicle speed V, the wheel speed VW and the presumed vehicle speed VR are varied as shown in FIG. 5A and the slip rate λ, the low-pass filter output ωF and the braking pressure $P_B$ are varied as shown in FIGS. 5B, 5C and 5D, depending upon the operation of the wheel brake, thereby the wheel avoids falling into a locked state. Specifically, when the slip rate λ becomes larger than a first preset slip rate S0 and the low-pass filter output ωF becomes smaller than a first preset acceleration α0 which is a negative value, pressure-reduction control is started. When the low-pass filter output ωF exceeds the first preset acceleration α0, pressure-reduction control is terminated, a braking-pressure maintaining control is started. Further, when the wheel speed VW starts to be restored, and the slip rate λ becomes smaller than a second preset slip rate S1 (( S0) and the low-pass filter output ωF becomes smaller than a second preset acceleration α1, pressure-increase control is started.

The main reason why the low-pass filter output ωF is used rather than the wheel acceleration ω itself for switching-over the control mode in the operation control means 3 is to avoid a hunting of pressure-increasing→pressure-reduction→pressure-maintaining due to a fine variation in wheel speed due to a road surface condition or a pressure-increase or pressure-reduction pulse. However, there is a possibility that a retard of the termination time point of the pressure reduction and an excessive pressure reduction may be produced, particularly on a road surface having a high coefficient of friction, due to a phase lag of a renewing cycle of the wheel speed or the low-pass filter output ωF. If excessive pressure reduction is produced, variation in fluid pressure throughout the anti-lock brake control cycle is increased to bring about a degradation in feeling of the braking operation and a degradation in riding comfort.

SUMMARY OF THE INVENTION

Accordingly, it is an object of the present invention to provide an anti-lock brake control system for a vehicle, wherein an excessive pressure reduction is prevented during an anti-lock brake control on a road surface having a high coefficient of friction.

To achieve the above object, according to a first aspect and feature of the present invention, there is provided an anti-lock brake control system for a vehicle, comprising: an actuator for regulating the braking pressure for a wheel brake; a wheel speed detecting device for detecting a wheel speed; a wheel acceleration calculating device for differentiating the wheel speed detected by the wheel speed detecting device to provide a wheel acceleration; a vehicle speed calculating device for calculating a presumed vehicle speed based on the wheel speed detected by the wheel speed detecting device; a slip rate calculating device for calculating a slip rate based on the wheel speed detected by the wheel speed detecting device and the presumed vehicle speed determined in the vehicle speed calculating device; a low-pass filter for filtering the wheel acceleration determined in the wheel acceleration calculating device; and an operation control device for controlling the actuator based on at least the slip rate determined in the slip rate calculating device and an output from the low-pass filter during a braking operation to switch-over the reduction, the maintaining and the increasing of the braking pressure from one to another; wherein the operation control device has a function to terminate the braking pressure-reduction control in response to the wheel acceleration, determined in the wheel acceleration calculating device becoming equal to or greater than a preset value.

With the above first feature of the present invention, it is possible to avoid a phase lag due to the low-pass filter output to carry out an appropriate pressure-reduction control, thereby enhancing the feeling of the braking operation and enhancing the riding comfort.

In addition, according to a second aspect and feature of the present invention, there is provided an anti-lock brake control system for a vehicle, comprising: an actuator for regulating the braking pressure for a wheel brake; a wheel speed detecting device for detecting a wheel speed; a wheel acceleration calculating device for differentiating the wheel speed detected by the wheel speed detecting device to provide a wheel acceleration; a vehicle speed calculating device for calculating a presumed vehicle speed based on the wheel speed detected by the wheel speed detecting device; a slip rate calculating device for calculating a slip rate based on the wheel speed detected by the wheel speed detecting device and the presumed vehicle speed determined in the vehicle speed calculating device; a low-pass filter for filtering the wheel acceleration determined in the wheel acceleration calculating device; and an operation control device for controlling the actuator based on at least the slip rate determined in the slip rate calculating device and an output from the low-pass filter during a braking operation to switch-over the reduction, the maintaining and the increasing of the braking pressure from one to another; wherein the anti-lock brake control system includes a differentiating device for differentiating an output from the low-pass filter, and the operation control device has a function to terminate the braking pressure-reduction control in response to an output from the differentiating device becoming equal to or greater than a preset value.

With the above second feature of the present invention, it is possible to avoid a phase lag due to the low-pass filter output to perform an appropriate pressure-reduction control and enhance the feeling of the braking operation and enhance riding comfort.

The above and other objects, features and advantages of the invention will become apparent from the following description of a preferred embodiment taken in conjunction with the accompanying drawings.

BRIEF DESCRIPTION OF THE DRAWINGS

FIG. 5A to 5D are timing charts similar to FIG. 3, but illustrating the prior art system.

DETAILED DESCRIPTION OF THE PREFERRED EMBODIMENT

The present invention will now be described by way of a preferred embodiment with reference to the accompanying drawings.

Figure 1:
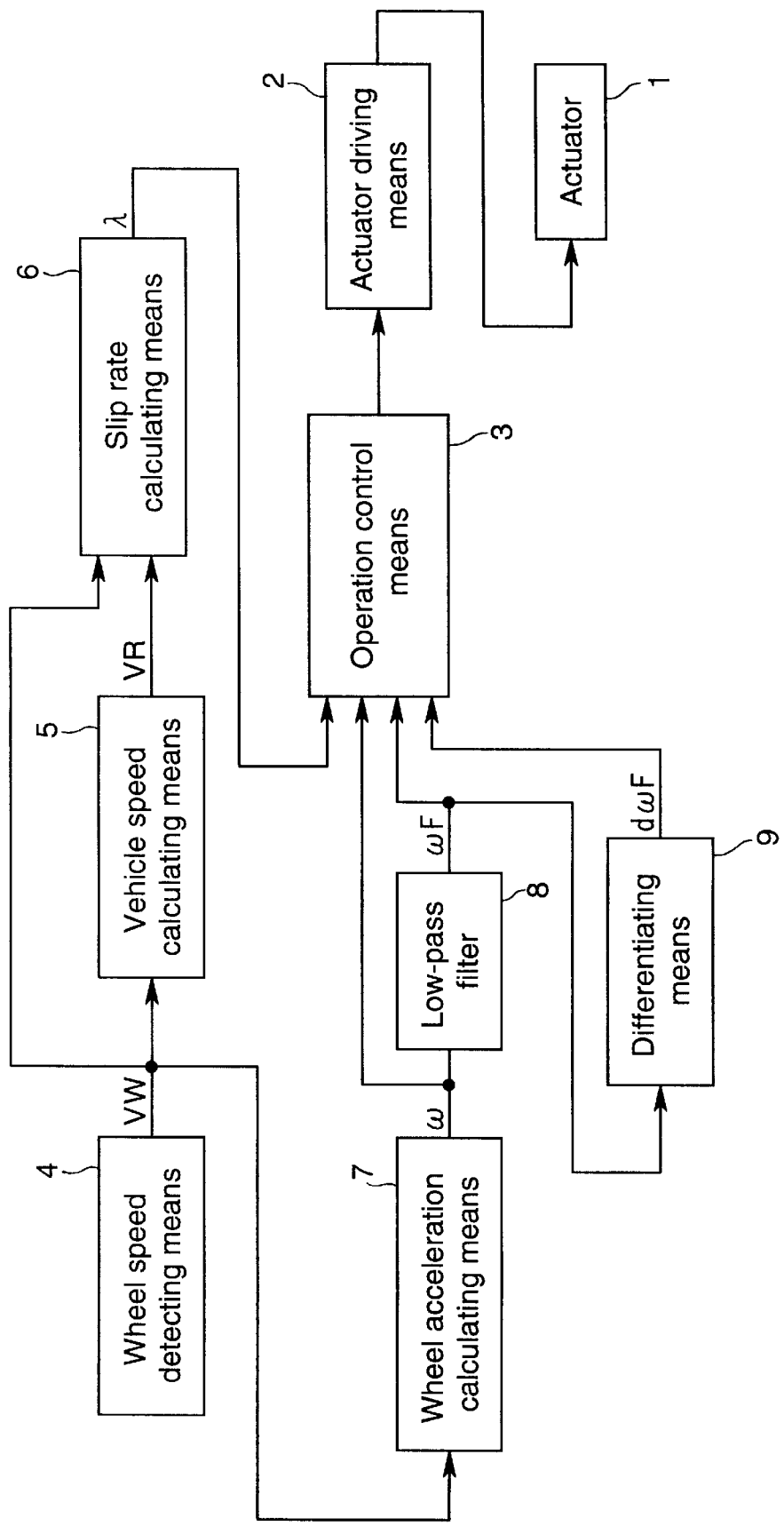
FIG. 1 is a block diagram illustrating the arrangement of an anti-lock brake control system.
Figure 2:
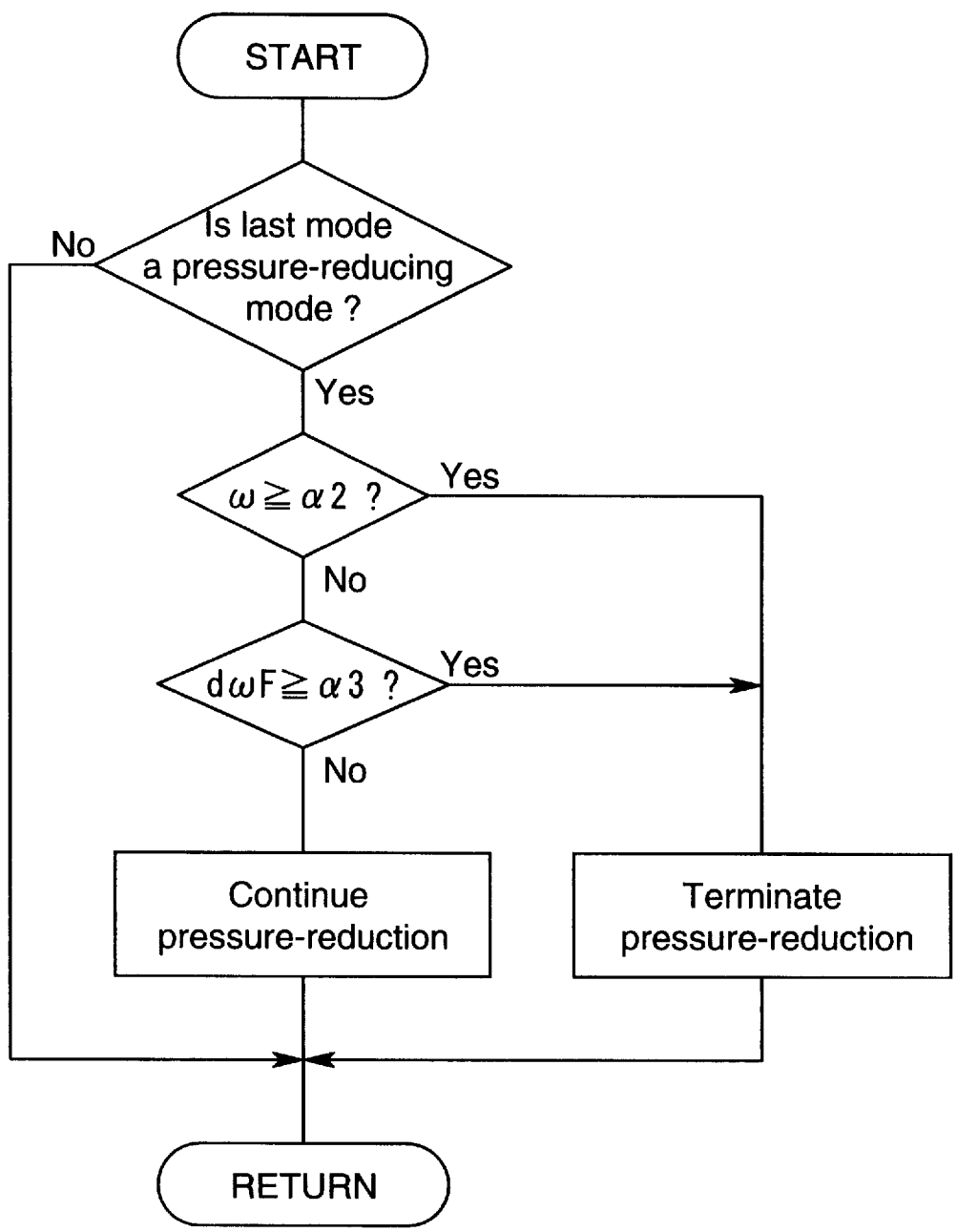
FIG. 2 is a flowchart illustrating a pressure-reduction terminating procedure.

Referring first to FIG. 1, an actuator 1 for regulating the braking pressure for a wheel brake is driven by an actuator driving means 2, which drives the actuator 1 in response to a control signal input from an operation control means 3 to switch-over decreasing, maintaining and increasing braking pressure modes from one to another.

A wheel speed VW based on a rotational speed of a wheel (not shown) is calculated by a wheel speed detecting means 4 and input to a vehicle speed calculating means 5, a slip rate calculating means 6 and a wheel acceleration calculating means 7. In the vehicle speed calculating means 5, a presumed vehicle speed VR is calculated based on the wheel speed VW in such a manner that the deceleration of the presumed vehicle speed VR is not equal to or lower than a preset deceleration. In the wheel acceleration calculating means 7, a wheel acceleration ω is determined by the differentiation of the vehicle speed VW. The presumed vehicle speed VR, determined in the vehicle speed calculating means 5, is input to the slip rate calculating means 6, where a slip rate λ is calculated based on the wheel speed VW and the presumed vehicle speed VR.

The wheel acceleration ω, determined in the wheel acceleration calculating means 7, is input to a low-pass filter 8. A low-pass filter output ωF, obtained by filtering of the wheel acceleration ω, is delivered from the low-pass filter 8 and further differentiated in a differentiating means 9.

The slip rate λ determined in the slip rate calculating means 6, the wheel acceleration ω determined in the wheel acceleration calculating means 7, the low-pass filter output ωF from the low-pass filter 8 and the low-pass filter output differentiation value dωF determined in the differentiating means 9 are input to the operation control means 3. The operation control means 3 determines a control signal in a manner to switch-over reducing, maintaining and increasing braking pressure modes from one to another depending upon input signals λ, ω, ωF and dωF. The control signal is applied from the operation control means 3 to the actuator driving means 2.

Figure 4:
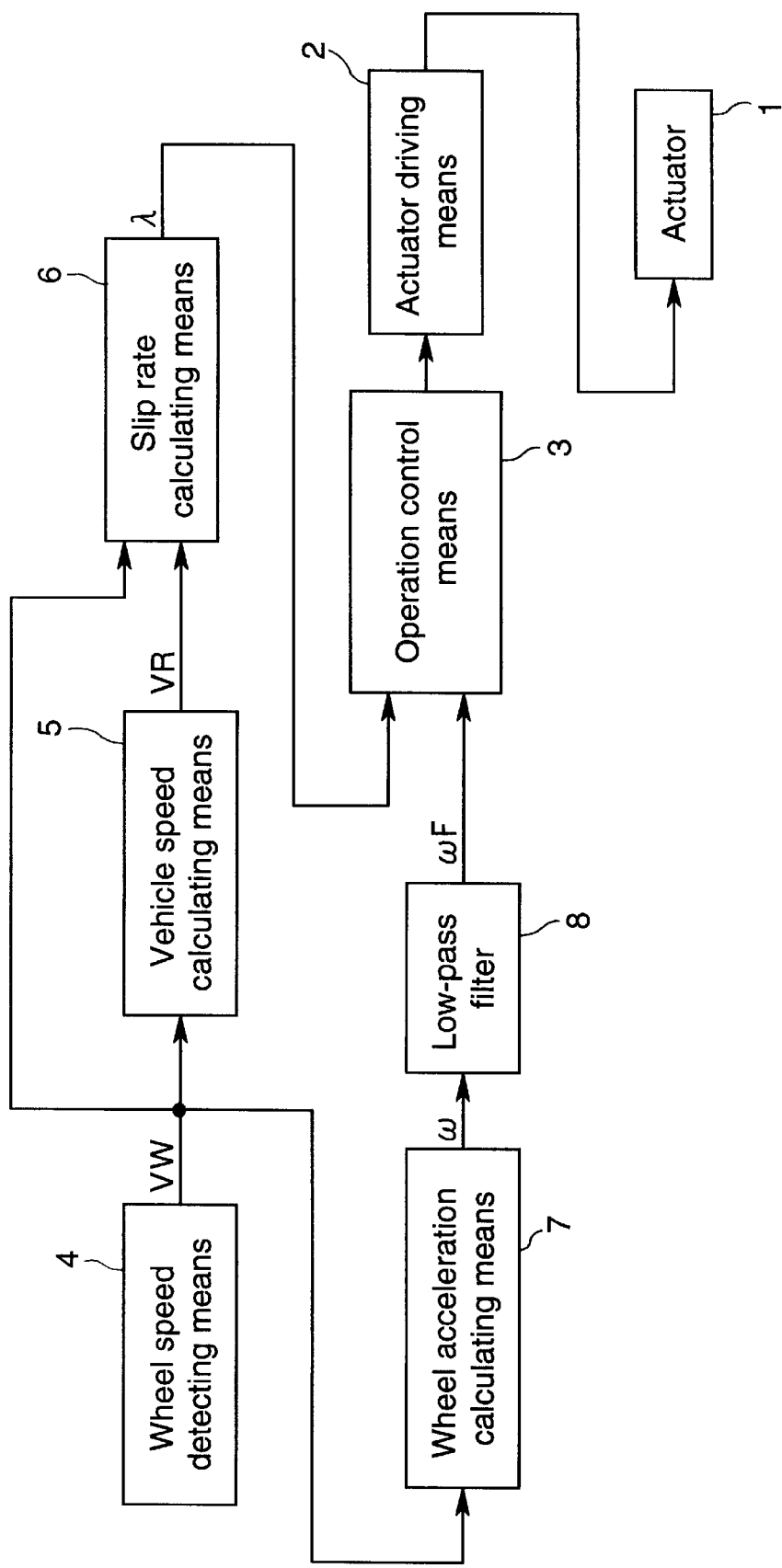
FIG. 4 is a block diagram similar to FIG. 1, but illustrating the prior art system.

In the operation control means 3, the conditions for starting the speed-reduction and the speed-increase are set identically to those in the prior art shown in FIGS. 4 and 5. Specifically, when the slip rate λ is larger than a first preset slip rate S0 and the low-pass filter output ωF is smaller than a first preset acceleration α0 which is a negative value, the pressure-reduction control is started. When the slip rate λ is smaller than a second preset slip rate S1 and the low-pass filter output ωF is smaller than a second preset acceleration α1 which is a positive value, the pressure-increase control is started.

In determining the termination of the pressure-reduction, namely, the start of the maintaining mode, the wheel acceleration ω or the low-pass filter output differentiation value dωF is employed. Specifically, when the wheel acceleration ω exceeds a third preset acceleration α2 which is a negative value, or the low-pass filter output differentiation value dωF exceeds a preset value α3 which is a positive value, the pressure-reduction control is terminated.

Figure 3:
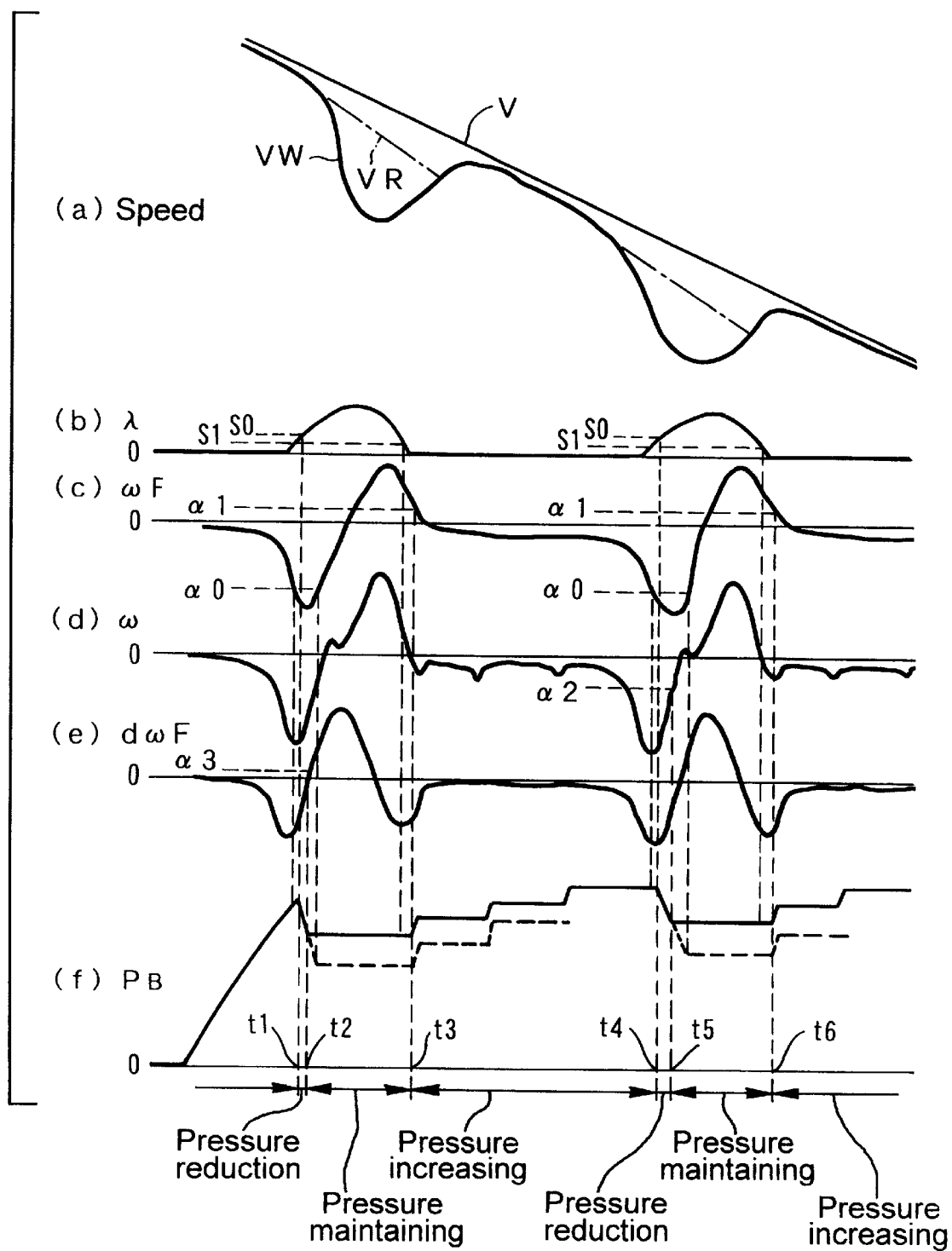
FIG. 3 is a timing chart of an anti-lock brake control.

The third present acceleration α2 and the present value α3 will be described with reference to FIG. 3. As the low-pass filter output ωF is decreased and braking liquid pressure is reduced, the wheel acceleration is varied from a peak value of deceleration in a direction to reduce the deceleration. The third preset acceleration α2 is set at a negative value which is larger than the first preset acceleration α0 by a quantity substantially corresponding to a phase lag due to the filtering by the low-pass filter in the course of the above-described variation of the wheel acceleration. The preset value α3 is set at a positive small value in correspondence to a low-pass filter output differentiation value immediately before the low-pass filter output ωF reaches the first preset acceleration α0, when the low-pass filter output ωF is inverted from the peak value of the deceleration in the direction to reduce the deceleration, with a reduction in braking liquid pressure.

The operation of this embodiment will be described below with reference to FIG. 3. When the wheel speed VW, the actual vehicle speed V and the presumed vehicle speed VR are varied as shown at (a) in FIG. 3, the slip rate λ, the low-pass filter output ωF, the wheel acceleration ω, the low-pass filter output differentiation value dωF and the braking liquid pressure $P_B$ are varied as shown at (b), (c), (d), (e) and (f) in FIG. 3. Thus, the pressure-reduction control for the braking liquid pressure $P_B$ is started at a time point t1 at which the slip rate λ exceeds the first preset slip rate S0 after the low-pass filter output ωF has been decreased to a value smaller than the first preset acceleration α0 in response to an increase in braking liquid pressure $P_B$ provided as a result of the braking operation.

The wheel acceleration ω to is inverted and increased in the direction to reduce the deceleration as a result of the pressure-reduction control, but the low-pass filter output differentiation value dωF becomes larger than the preset value α3 at a time point t2 before the low-pass filter output ωF reaches the first preset acceleration α0. At this time point t2, the pressure-reduction control is terminated, and the maintaining mode is started.

Under conditions where the low-pass filter output ωF has been inverted from the peak value in the increasing direction, and the slip rate λ has become smaller than the preset slip rate S1 by the maintaining of the braking liquid pressure $P_B$, the maintaining mode is terminated and the pressure-increase control is started, at a time point t3 at which the low-pass filter output ωF becomes smaller than the second preset acceleration α1 which is a positive value.

As the braking liquid pressure $P_B$ is gradually increased by the pressure-increase control, the pressure-reduction control for the braking liquid pressure $P_B$ is started at a time point t4 at which the slip rate λ exceeds the preset slip rate S0 after the low-pass output ωF has become smaller than the first preset acceleration α0, as at the time point t1.

As the pressure-reduction control is conducted, the wheel acceleration ω is inverted in the deceleration decreasing direction and increased, but the pressure-reduction control is terminated as the wheel acceleration ω becomes larger than the third preset value α2 before the low-pass filter output ωF reaches the first preset acceleration α0.

As the maintaining mode is sustained after the termination of the pressure-reduction control, the slip rate λ becomes smaller than the second preset slip rate S1 and moreover, at a time point t6 at which the low-pass filter output ωF becomes smaller than the second preset acceleration α1, the maintaining mode is terminated, and the pressure-increase control is started.

In the manner, by terminating the pressure-reduction control at the time when the wheel acceleration ω exceeds the third preset acceleration α2 which is a negative value, or when the low-pass filter output differentiation value dωF exceeds the preset value α3 which is the positive value, the phase lag can be prevented from being produced, as compared with the prior art system in which the pressure-reduction control is terminated at the time when the low-pass filter output ωF exceeds the first preset acceleration α0. Since the braking liquid pressure $P_B$ is largely reduced as shown by a dashed line in FIG. 3 in the prior art system, the appropriate pressure-reduction control is feasible in the system according to the present invention. Thus, it is possible to prevent an excessive reduction in the pressure due to a retard of the termination time point of the pressure-reduction, thereby decreasing the variation in fluid pressure throughout the anti-lock brake control cycle to a relatively small level and enhancing the feeling of the braking operation and enhancing riding comfort.

The time point of termination of the pressure-reduction control may be determined using only the wheel acceleration without use of the low-pass filter output differentiation value, and alternatively, may also be determined using only the low-pass filter output differentiation value without use of the wheel acceleration.

Although the embodiment of the present invention has been described in detail, it will be understood that the present invention is not limited to the above-described embodiment, and various modifications in design may be made without departing from the spirit and scope of the invention defined in the claims.

What is claimed is:

1. An anti-lock brake control system for a vehicle comprising:

an actuator for regulating braking pressure for a wheel brake;

a wheel speed detecting means for detecting a wheel speed;

a wheel acceleration calculating means for differentiating said wheel speed detected by said wheel speed detecting means to provide a wheel acceleration;

a vehicle speed calculating means for calculating a presumed vehicle speed based on said wheel speed detected by said wheel speed detecting means;

a slip rate calculating means for calculating a slip rate based on said wheel speed detected by said wheel speed detecting means and said presumed vehicle speed determined in said vehicle speed calculating means;

a low-pass filter for filtering the wheel acceleration determined in said wheel acceleration calculating means;

a differentiating means for differentiating an output from said low-pass filter to obtain a differentiated value; and an operation control means receiving said slip rate, said wheel acceleration, said filtered wheel acceleration and said differentiated value of said output of the low-pass filter, and for controlling said actuator based on at least said slip rate determined in said slip rate calculating means and said output from said low-pass filter during a braking operation to switch-over reduction, maintaining and increasing of the braking pressure from one to another;

wherein said operation control means terminates braking pressure-reduction control in response to one of two conditions that are (1) when said output from said differentiating means becomes equal to or greater than a preset value; and (2) when said wheel acceleration becomes equal to or greater than another preset value.

* * * * *